United States Patent
Parsons

(10) Patent No.: US 8,277,157 B2
(45) Date of Patent: Oct. 2, 2012

(54) TIE-DOWN DEVICE

(75) Inventor: David Allen Parsons, Diamond Creek (AU)

(73) Assignee: Ford Motor Company of Australia Ltd., Campbellfield (AU)

( * ) Notice: Subject to any disclaimer, the term of this patent is extended or adjusted under 35 U.S.C. 154(b) by 413 days.

(21) Appl. No.: 12/390,064

(22) Filed: Feb. 20, 2009

(65) Prior Publication Data
US 2010/0202850 A1 Aug. 12, 2010

(30) Foreign Application Priority Data
Feb. 12, 2009 (AU) ................. 2009200552

(51) Int. Cl.
*B60P 7/00* (2006.01)
(52) U.S. Cl. .................................... 410/104; 410/106
(58) Field of Classification Search ............ 410/8, 104, 410/105, 106, 110, 116, 107, 111; 248/499; 24/115 K, 265 CD; 114/218
See application file for complete search history.

(56) References Cited

U.S. PATENT DOCUMENTS

| | | |
|---|---|---|
| 3,643,973 A | 2/1972 | Bott |
| 4,015,760 A | 4/1977 | Bott |
| 4,343,419 A | 8/1982 | Mareydt |
| 4,739,528 A | 4/1988 | Allen |
| 4,883,208 A | 11/1989 | Bott |
| 5,259,711 A | 11/1993 | Beck |
| 5,409,335 A | 4/1995 | Beck |
| 5,476,349 A | 12/1995 | Okland |
| 5,494,388 A | 2/1996 | Stevens |
| 5,560,576 A | 10/1996 | Cargill |
| 6,050,763 A | 4/2000 | Swailes |
| 6,382,486 B1 | 5/2002 | Kretchman et al. |
| 6,821,067 B1 | 11/2004 | Von Loehr |
| 6,848,873 B1 | 2/2005 | Husk |
| 7,040,849 B2 | 5/2006 | Cunningham et al. |
| 7,156,593 B1 | 1/2007 | Saward et al. |
| 7,281,889 B2 | 10/2007 | Anderson et al. |
| 7,318,695 B2 | 1/2008 | Yu et al. |
| 2003/0053879 A1* | 3/2003 | Delay ....................... 410/104 |
| 2005/0036848 A1 | 2/2005 | Cunningham et al. |
| 2006/0177283 A1 | 8/2006 | Terry et al. |
| 2008/0014041 A1 | 1/2008 | Randazzo et al. |

FOREIGN PATENT DOCUMENTS

| | | |
|---|---|---|
| AU | 2003248384 B2 | 4/2004 |
| WO | 0128811 A1 | 4/2001 |
| WO | 2006007813 A1 | 1/2006 |
| WO | 2006020937 A2 | 2/2006 |
| WO | 2006029853 A1 | 3/2006 |
| WO | 2006122357 A1 | 11/2006 |
| WO | 2007034109 A1 | 3/2007 |
| WO | 2007073313 A1 | 6/2007 |

* cited by examiner

*Primary Examiner* — Stephen Gordon
(74) *Attorney, Agent, or Firm* — James Dottavio; Brooks Kushman P.C.

(57) ABSTRACT

The present invention relates to a tie-down device comprising a base member and a retaining member, the retaining member having a plate and a pin extending from the plate, the pin being engageable with a part of a channel or structure associated with the channel, the plate being engageable with another part of the channel or structure associated with the channel by pushing the retaining member to a distal position away from the base member and twisting the retaining member whilst in the distal position into engagement with the channel or structure associated with the channel.

9 Claims, 3 Drawing Sheets

TIE-DOWN DEVICE

CROSS-REFERENCE TO RELATED APPLICATIONS

This application claims foreign priority benefits under 35 U.S.C. §119(a)-(d) to AU 2009 200 552, filed Feb. 12, 2009, which is hereby incorporated by reference in its entirety.

BACKGROUND

1. Field

The present invention relates to a tie-down device. More particularly, the present invention relates to a tie-down device that is suitable for securing a load to the rear tray of a utility vehicle or similar vehicle.

2. Background Art

Tie-down devices are mechanical assemblies that are locked at various positions, typically along an elongated rail. In the vehicular field, for example, tie-down devices are used to secure a load to the rear tray of a utility vehicle and also to secure roof-racks to vehicle roofs. Various designs for tie-down devices have been proposed, ranging from simple screw-in arrangements to more complex mechanical constructions.

U.S. Pat. No. 7,156,593 describes a tie-down device that is suitable for use in securing a roof-rack to the roof of a vehicle. The device includes a lock plate that is used to secure the device to a selected location along a rail located on the vehicle roof. A sliding block is attached to the lock plate and a tie-down loop attached to the sliding block. A spring, disposed between the sliding block base and tie-down loop, provides a biasing force that positively secures the device to the rail. The device may be removed from the rail by pressing the tie-down loop in a direction opposite to the biasing force of the spring so that the lock plate can be released.

The present invention aims to provide an improvement, or at least an alternative, to the tie-down device of the sort described in U.S. Pat. No. 7,156,593.

SUMMARY

According to a first aspect of the present invention, there is provided a tie-down device comprising a base member and a retaining member, the retaining member having first and second retaining means suitable to retain the device in a channel, recess or the like, the first retaining means being engageable with a part of the channel or structure associated with the channel, and the second retaining means being engageable with another part of the channel or structure associated with the channel by pushing the retaining member to a distal position away from the base member and twisting the retaining member whilst in the distal position into engagement with the channel or structure associated with the channel.

The present invention provides a tie-down device that is easily and conveniently lockable within and removable from a channel, such as a c-shaped rail often found around the periphery of the rear tray of a utility vehicle. One or more tie-down devices according to the invention may be locked to a utility tray rail at selected locations to enable securing of a load to the rear tray.

Preferably, the device includes: third retaining means; and biasing means between the base member and the retaining member against which the retaining member acts in moving to the distal position, the arrangement being such that the third retaining means engages the channel or structure associated with the channel when the biasing means is released.

According to preferred embodiments of the invention, the first retaining means is a pin extending from the retaining member, the pin being configured to engage the channel or structure associated with the channel by locating in a hole provided therein.

The second retaining means may be provided in any convenient form. Typically, the second retaining means is a plate of suitable shape and size enabling twisting of the plate within the channel through a specified angle, whereupon opposed parts of the plate engage with the channel or structure associated with the channel to secure the device to the channel.

Optionally, the plate is elongated, having longer edges lying transverse to an axis of the base member and shorter edges lying approximately parallel to the axis, the arrangement being such that twisting the plate through approximately ninety degrees results in parts of the plate at or adjacent to the shorter edges engaging with the channel or the structure associated with the channel. At least two corners of the plate may have bevelled edges.

The third retaining means may be a pair of spaced apart, co-planar and substantially parallel elements provided on the base member on either side of the retaining member, such that in use the parallel elements engage in the channel under action of the biasing means to prevent further twisting of the device within the channel.

Optionally, the biasing means comprises one or more compression springs located between the base member and retaining member that are compressed when the retaining member is pushed away from the base member and uncompress, returning the retaining member back towards the base member, when the pushing force is removed.

The device may include indicating means for indicating when any one or more of the retaining means are not engaged with the channel or structure associated the channel.

According to an embodiment of the invention, the indicating means includes visual indicia provided on the retaining member that is only viewable when the retaining member is in the distal position. As the third retaining means is only engaged when the retaining member is not in the distal position, the visual indicia serve to indicate when the third retaining means is not engaged with the channel.

According to a second aspect of the present invention there is provided a tie-down device comprising:
a base member having a pair of spaced apart, co-planar and substantially parallel elements;
a retaining member having an elongated plate with longer edges lying transverse to an axis of the base member and shorter edges lying approximately parallel to the axis, the retaining member being movable to a distal position apart from the base member; and
a pin extending out of the elongated plate,
the device being securable to a channel by locating the pin in a hole provided in the channel or the structure associated with the channel, moving the retaining member to the distal position and rotating the retaining member whilst in the distal position, so that parts of the elongated plate at or adjacent to the shorter edges engage the channel or structure associated with the channel and the substantially parallel elements of the base member engage another part of the channel or structure associated with the channel.

The device may further include biasing means against which the retaining member acts to be moved to the distal position, such that the substantially parallel elements of the base member engage with the channel or structure associated with the channel under action of the biasing means.

BRIEF DESCRIPTION OF THE DRAWINGS

An embodiment of the invention will now be described with reference to the accompanying drawings in which.

DETAILED DESCRIPTION OF THE EMBODIMENT(S)

Figure 1:
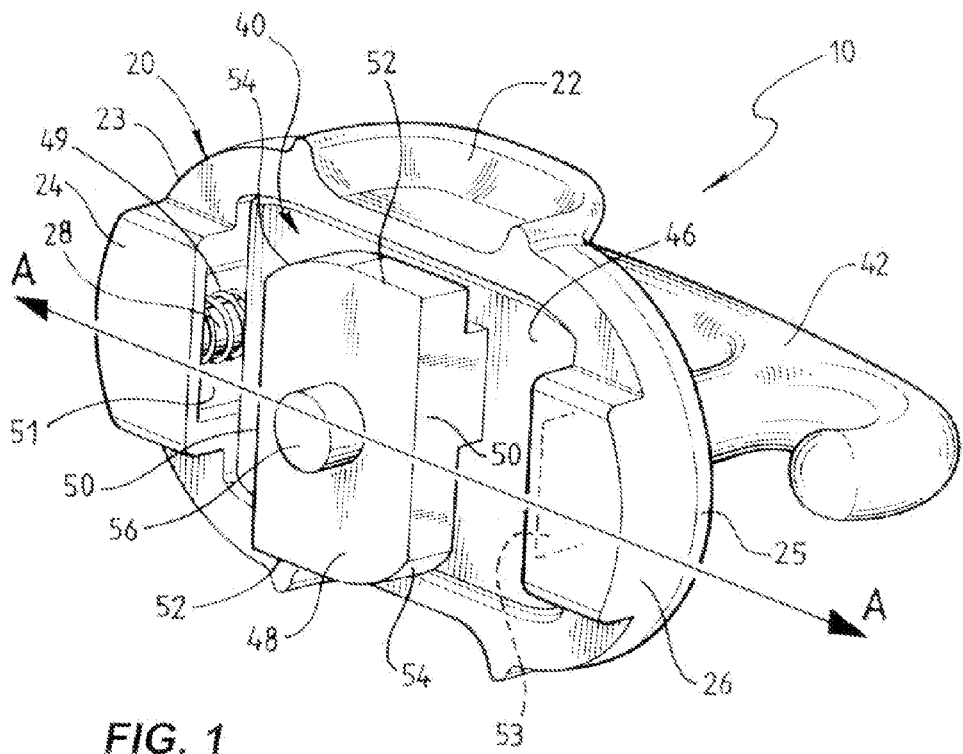
FIG. 1 is a perspective view of a tie-down device in accordance with an embodiment of the invention.
Figure 2:
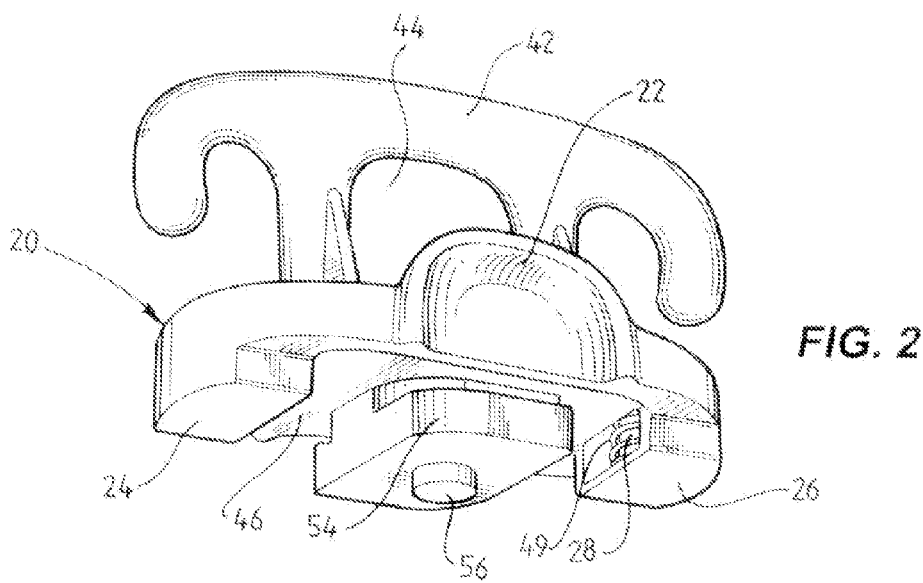
FIG. 2 is a perspective view from the side of the tie-down device illustrated in FIG. 1.
Figure 3:
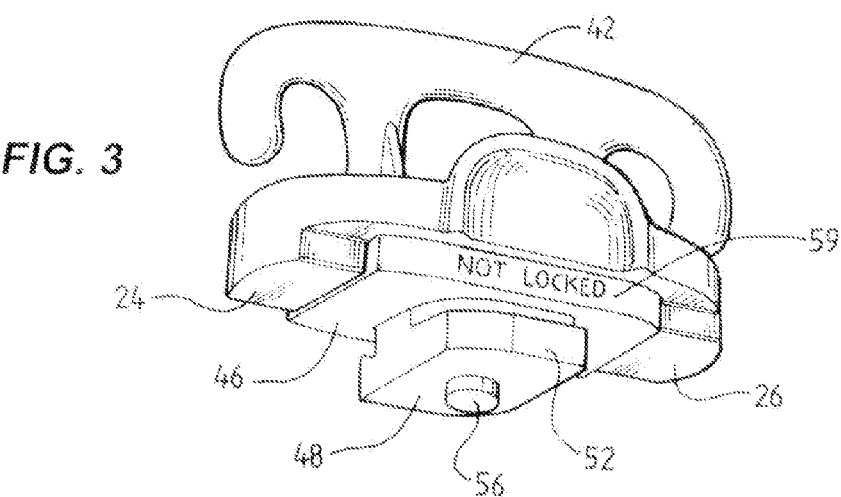
FIG. 3 is a perspective view from below of the tie-down device illustrated in FIGS. 1 and 2 showing the means for indicating when the device is not locked onto a rail.
Figure 4:
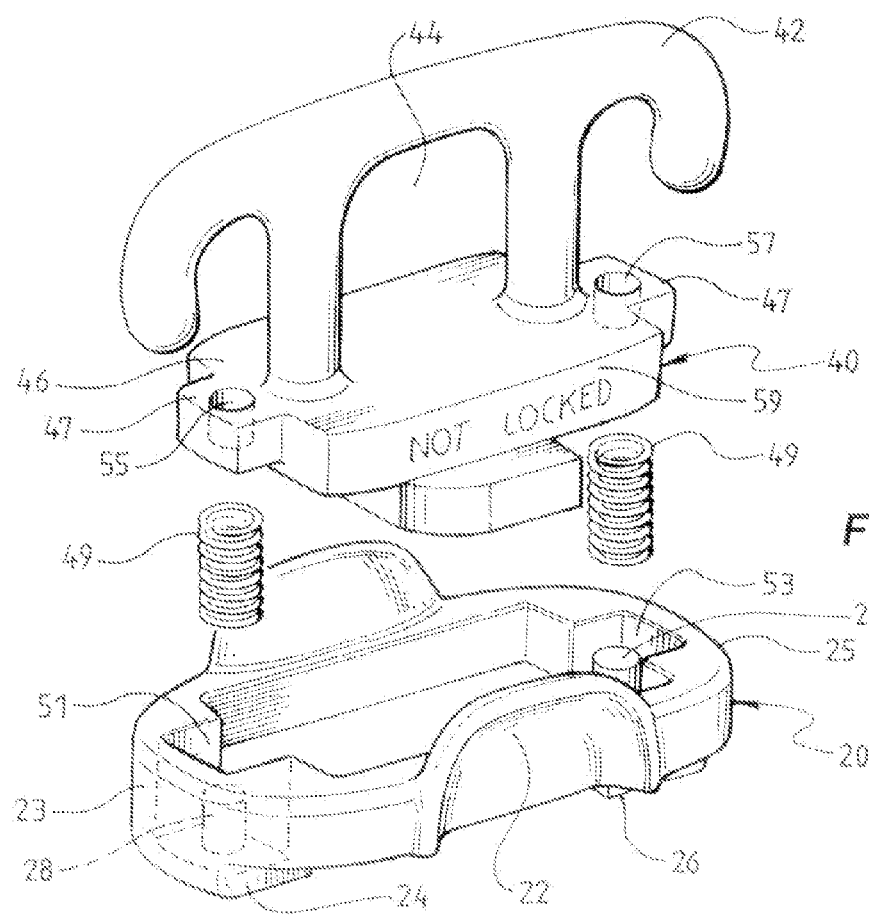
FIG. 4 is an exploded view of the tie-down device illustrated in FIGS. 1 to 3.
Figure 5:
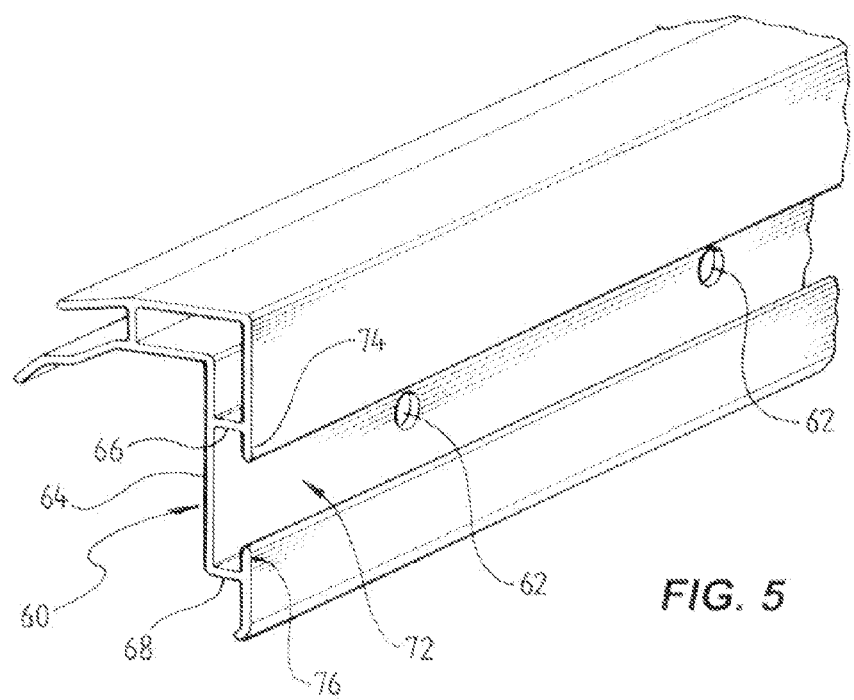
FIG. 5 is a perspective view of a c-shaped rail to which the tie-down device described illustrated in FIGS. 1 to 4 is attachable.

A tie-down device 10 is illustrated by reference to FIGS. 1 to 4. Device 10 is composed of a roughly oval shaped base member 20 (in the form of a bezel) and a retaining member 40. A cleat 42, in which a loop 44 is provided, projects upwardly from retaining member 40. Fastening means, including ropes and the like, are attachable to cleat 42 in order to tie down and secure load to the rear tray of a utility vehicle to which device 10 is attached.

A pair of arched recessed areas 22 are provided on either side of base member 20. Recesses 22 extend upwardly out of the plane in which base member 20 lies. As described in greater detail below, recesses 22 are used as grips for attaching device 10 to a rail.

Members 24 and 26 are provided roughly midway along each of the shorter sides 23 and 25 of base member 20. Members 24 and 26 are the same shape and size and both project downwardly from the plane defined by the lower side of base member 20.

Base member 20 is manufactured from a thermo plastic material, whereas retaining member 40 and cleat 42 are manufactured from a plastic coated metallic material. Cleat 42 is attached to a base plate 46. Tabs 47 extend from either end of base plate 46 to be seated in voids 51 and 53 formed along the shorter sides 23 and 25 of base member 20 and defined by members 24 and 26. Projections 28 (FIGS. 1 and 2) are located in the centre of each void 51 and 53. Apertures 55 and 57 extend through each tab 47, with projections 28 locating in each aperture.

A spring 49 is provided along the longitudinal axis of each projection 28.

An elongated plate 48 extends downwardly from base plate 46. Elongated plate 48 lies transverse to the longitudinal axis A (FIG. 1) of base member 20. In particular, longer sides 50 of elongated plate 48 lie transverse to longitudinal axis A and shorter edges 52 of elongated plate 48 lie parallel to longitudinal axis A. Diametrically opposed corners 54 of elongated plate 48 are bevelled, whereas the opposite corners are square.

A pin 56 extends out of the centre of elongated plate 48.

In use, device 10 is insertable at a selected location along a rail 60. Typically, rail 60 is provided around the periphery, or on the floor, of a rear tray of a utility vehicle. Apertures 62 are provided at selected locations along rail 60, with a device 10 being insertable at one or more apertures 62 as desired.

Rail 60 has a c-shaped profile, defined by a rear wall 64, upper 66 and lower walls 68 extending perpendicularly from rear wall 64, and upper 74 and lower flanges 76, respectively extending perpendicularly from upper and lower walls 66 and 68 to each lie parallel with rear wall 64. A channel 72 is defined by each of walls 64, 66 and 68 and flanges 74 and 76.

Figure 6:
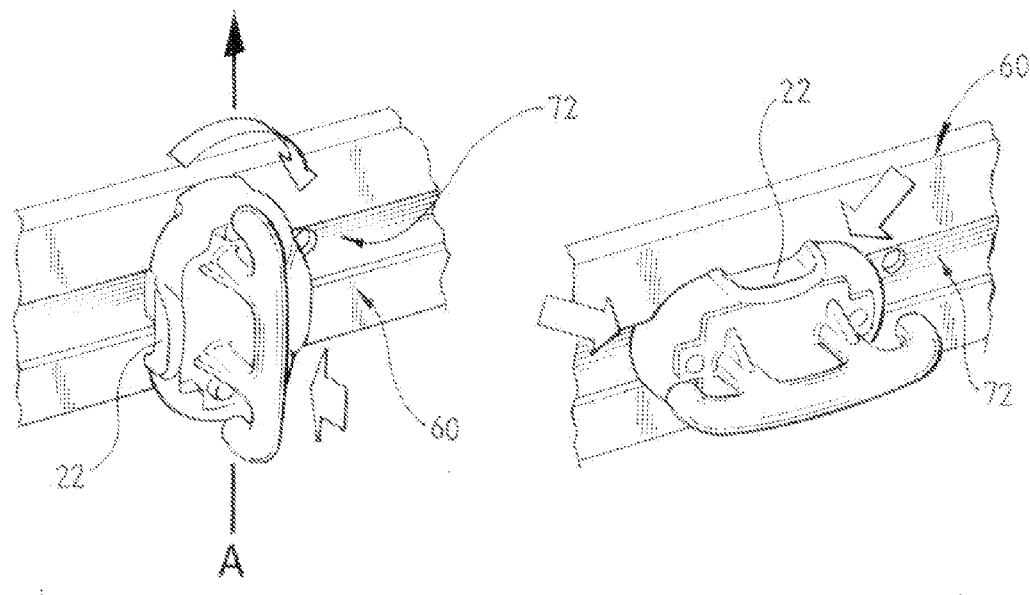
FIG. 6 is a view that illustrates the mode of attachment of the tie-down device to the rail.

Device 10 is attached to rail 60 (FIG. 6) by first locating device 10 in channel 72 with longitudinal axis A facing in an upwards direction. Base plate 46 locates within channel 72. Channel 72 has a width of roughly the same as the length of longer sides 50 of elongate plate 48.

Device 10 is then slid along rail 60 until pin 56 slots into one of the apertures 62. Cleat 42 is pushed inwardly by gripping recesses 22 with a thumb and another finger and pushing cleat 42 against base member 20. Tabs 47 compress spring 49, thereby causing retaining member 40 to move away from base member 20 to a distal position (illustrated in FIG. 3). Whilst in this distal position, cleat 42 is rotated in a clockwise direction through an angle of approximately 90 degrees. This action causes shorter edges 52 of elongate plate 48 to rotate into, and be held by, recesses respectively formed by upper wall 66 and upper flange 74, and lower wall 68 and lower flange 76. Rotation of cleat 42 also causes members 24 and 26 to be rotated to a position above channel 72. When the gripping finger and thumb are removed from recesses 52, springs 49 uncompress, causing base member 20 to move back towards retaining member 40 and members 24 and 26 to snap into channel 72. An audible "click" noise is heard when members 24 and 26 snap into channel 72, thereby communicating to a user that device 10 is properly attached.

In addition, wording (FIG. 3) on the lateral edge 59 of base plate 46 indicating that the device is 'not locked', becomes viewable when retaining member 40 is moved away from base member 20 to the distal position. If base member 20 does not return to its original position relative to retaining member 40—signifying that members 24 and 26 are properly locked in place in channel 72—then the wording remains visible to a user, thereby communicating the fact the device is not correctly locked into place.

Device 10 is removed from rail 60 by carrying out the steps discussed above in the opposite order. Namely, base member 20 is gripped at recesses 22 and pulled upwardly until members 24 and 26 are free of channel 72. Retaining member 40 is rotated in an anti-clockwise direction through approximately 90 degrees, causing shorter edges 52 to rotate out of the recesses respectively formed by upper wall 66 and upper flange 74, and lower wall 68 and lower flange 76. Retaining member 40 is then pulled free of channel 72, with pin 56 coming out of engagement with selected aperture 62. The word 'comprising' and forms of the word 'comprising' as used in this description do not limit the invention claimed to exclude any variants or additions.

Modifications and improvements to the invention will be readily apparent to those skilled in the art. Such modifications and improvements are intended to be within the scope of this invention.

What is claimed:

1. A tie-down device comprising a base member and a retaining member, the retaining member having a plate and a pin extending from the plate, the pin being engageable with a part of a channel by locating in a hole provided in the channel, the plate being engageable with another part of the channel by pushing the retaining member to a distal position away from the base member and twisting the retaining member whilst in the distal position into engagement with the channel.

2. A tie-down device according to claim 1, further including:
   a pair of spaced apart, co-planar and substantially parallel elements provided on the base member on either side of the retaining member; and
   biasing means between the base member and the retaining member against which the retaining member acts in moving to the distal position, the parallel elements engaging the channel when the biasing means is at least partially released.

3. A tie-down device according to claim 1, wherein the plate is elongated, having longer edges lying transverse to an axis of the base member and shorter edges lying approximately parallel to the axis, wherein twisting the plate through approximately ninety degrees results in parts of the plate proximate to the shorter edges engaging with the channel.

4. A tie-down device according to claim 2, wherein the parallel elements engage in the channel under action of the biasing means to inhibit twisting of the device within the channel.

5. A tie-down device according to claim 2, wherein the biasing means comprises one or more compression springs located between the base member and the retaining member that are compressed when the retaining member is pushed away from the base member and uncompress, returning the retaining member back towards the base member, when a pushing force acting on the springs is removed.

6. A tie-down device according to claim 2, further including indicating means for indicating when any one or more of the pin, plate or parallel elements are not engaged with the channel.

7. A tie-down device according to claim 6, wherein the indicating means includes visual indicia provided on the retaining member that is only viewable when the retaining member is in the distal position.

8. A tie-down device according to claim 1, wherein twisting of the retaining member causes the plate to rotate within the channel through a specified angle, whereupon opposed parts of the plate engage with the channel to secure the device to the channel.

9. A tie-down device according to claim 1, further including indicating means for indicating when any one or more of the pin or plate are not engaged with the channel.

* * * * *